(12) United States Patent
Grimberg et al.

(10) Patent No.: US 11,885,211 B2
(45) Date of Patent: Jan. 30, 2024

(54) DRILLING RIG SOFTWARE SYSTEM CONTROLS RIG EQUIPMENT TO AUTOMATE ROUTINE DRILLING PROCESSES

(71) Applicant: National Oilwell Varco, L.P., Houston, TX (US)

(72) Inventors: Edgar Grimberg, Houston, TX (US); Gaute Eilertsen, Houston, TX (US); Cole Wong, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 207 days.

(21) Appl. No.: 16/650,774

(22) PCT Filed: Sep. 29, 2017

(86) PCT No.: PCT/US2017/054446
§ 371 (c)(1),
(2) Date: Mar. 25, 2020

(87) PCT Pub. No.: WO2019/066932
PCT Pub. Date: Apr. 4, 2019

(65) Prior Publication Data
US 2020/0240256 A1    Jul. 30, 2020

(51) Int. Cl.
*E21B 44/00* (2006.01)
*G05B 19/042* (2006.01)

(52) U.S. Cl.
CPC .......... *E21B 44/00* (2013.01); *G05B 19/0426* (2013.01); *G05B 2219/23266* (2013.01)

(58) Field of Classification Search
CPC ................ E21B 44/00; G05B 19/0426; G05B 2219/23266
See application file for complete search history.

(56) References Cited

U.S. PATENT DOCUMENTS

| 5,358,058 A | 10/1994 | Edlund et al. |
| 2008/0173480 A1 | 7/2008 | Annaiyappa et al. |
| 2011/0213601 A1 | 9/2011 | Pirovolou |
| 2012/0024606 A1 | 2/2012 | Pirovolou et al. |
| 2012/0059521 A1* | 3/2012 | Iversen .................. E21B 44/00 700/275 |
| 2012/0173218 A1 | 7/2012 | Shafer et al. |
| 2014/0353033 A1 | 12/2014 | Pink et al. |

(Continued)

FOREIGN PATENT DOCUMENTS

WO    2016102381 A1    6/2016

OTHER PUBLICATIONS

International Search Report and Written Opinion received in PCT Application No. PCT/US2017/054446, dated Dec. 14, 2017.

(Continued)

*Primary Examiner* — Dany E Akakpo
(74) *Attorney, Agent, or Firm* — Blank Rome LLP

(57) ABSTRACT

Automated drilling may include receiving a tool-agnostic request to perform a process, determining one or more activities to complete the process, identifying a controller module associated with a first activity of the one or more activities, and triggering the controller module to initiate the first activity, wherein the controller module identifies and directs one or more drilling tools to initiate the first activity.

18 Claims, 7 Drawing Sheets

(56) References Cited

U.S. PATENT DOCUMENTS

2015/0362897 A1    12/2015  Chapman et al.
2017/0211372 A1     7/2017  Samuel
2019/0032466 A1*    1/2019  Wilson .................... E21B 44/00

OTHER PUBLICATIONS

Extended European Search report dated Mar. 31, 2021 in counterpart European Patent Application No. 17926804.0.

* cited by examiner

DRILLING RIG SOFTWARE SYSTEM CONTROLS RIG EQUIPMENT TO AUTOMATE ROUTINE DRILLING PROCESSES

Embodiments described herein generally relate to automated drilling, and more specifically to a drilling rig software system to control rig equipment to automate drilling processes.

BACKGROUND ART

Oilfield operations may be performed to locate and gather valuable downhole fluids. Oil rigs are positioned at wellsites, and downhole tools, such as drilling tools and other components, are deployed into the ground to reach subsurface reservoirs. Traditionally, human operators will need to press dozens of buttons in order to operate rig equipment to compete the drilling process. In addition, although a human operator may be relying on feedback provided by the downhole tools, drilling operations controlled by human operation may lack consistency, or may be subject to human error. Further, while some drilling applications allow for a software-based management of drilling operations, they often require the application developer to be keenly aware of the particulars of a rig, such as specific tools, and language needed to drive those tools.

DESCRIPTION OF EMBODIMENTS

Figure 1:
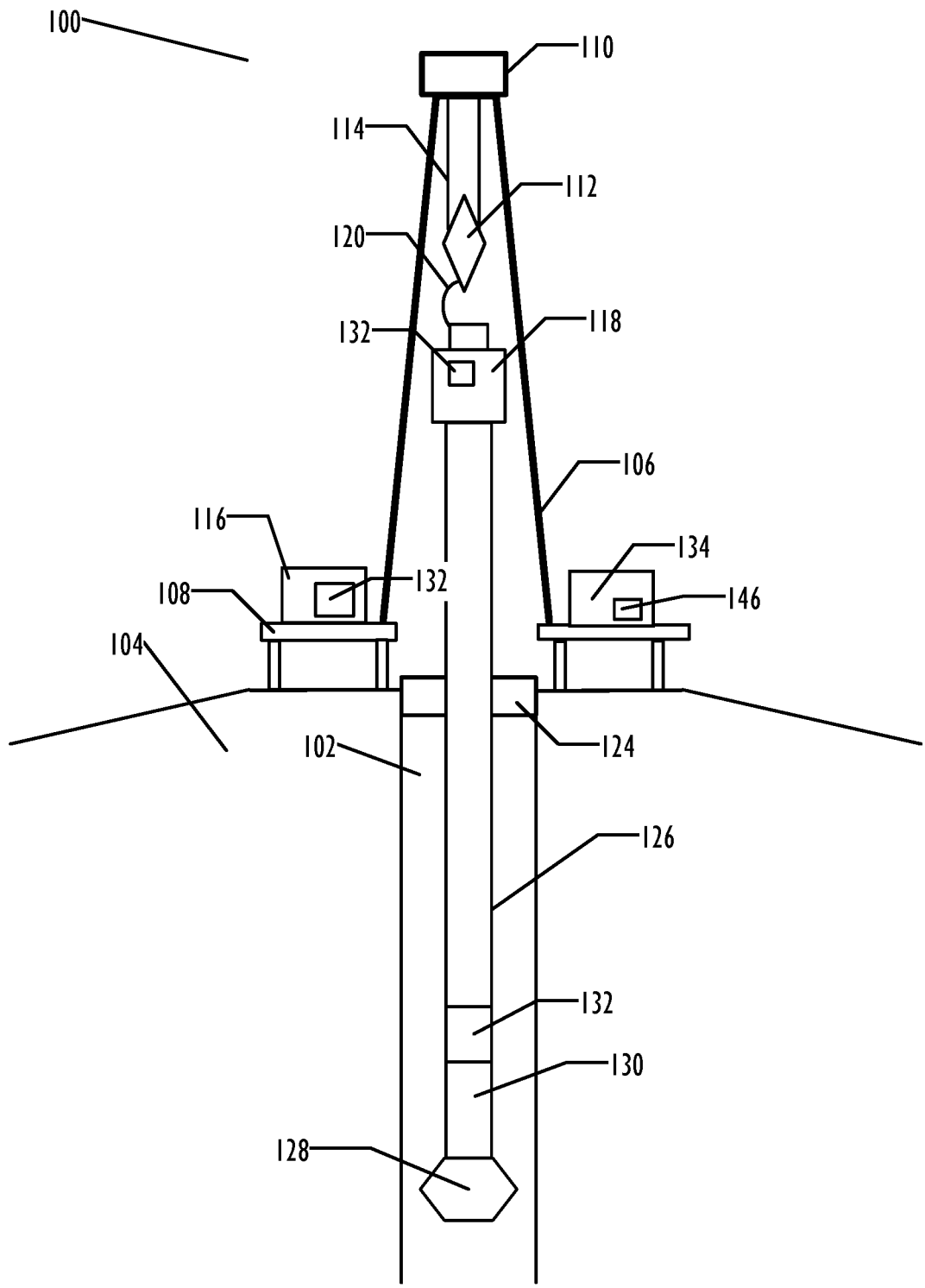
FIG. 1 is a diagram illustrating an apparatus for performing automated drilling operations utilizing a drilling rig software system.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of automated drilling having the benefit of this disclosure.

As used herein, the term "programmable device" can refer to a single programmable device or a plurality of programmable devices working together to perform the function described as being performed on or by the programmable device.

As used herein, the term "medium" refers to a single physical medium or a plurality of media that together store what is described as being stored on the medium.

As used herein, the term "network device" can refer to any programmable device that is capable of communicating with another programmable device across any type of network.

As used herein, the term "drilling rig" can refer to a land or offshore rig apparatus utilized to drill a borehole.

As used herein, the term "drilling tool" can refer to drilling components such as drilling devices or sensors utilized to perform drilling activities.

According to one or more embodiments, a drilling rig software system may be utilized to perform automated drilling functions. A rig operating system may receive tool-agnostic instructions to employ a process. The request may be received by a service layer, which coordinates the tool-agnostic request. In one or more embodiments, the service layer may identify and coordinate activities that comprise the requested service or process. The service layer may direct an activity layer to complete the various activities. In one or more embodiments, the activity layer may coordinate the instructions to various activity-specific controller modules, which may then direct the drilling tools required to complete the activity of the requested process. In one or more embodiments, various processes and/or activities within a process may be directed by one or more applications. The application from which the instructions are received and/or followed may be determined based on a current drilling status, time, or other contextual information.

In one embodiment of the invention, as illustrated in FIG. 1, an apparatus 100 for automated drilling of a borehole 102 in a subsurface formation 104 includes a derrick 106 on a rig floor 108. A crown block 110 is mounted at the top of the derrick 106, and a traveling block 112 hangs from the crown block 110 by means of a cable or drilling line 114. One end of the cable or drilling line 114 is connected to drawworks 116, which is a reeling device operable to adjust the length of the cable or drilling line 114 so that the traveling block 112 moves up and down the derrick 106. A top drive 118 is supported on a hook 120 attached to the bottom of the traveling block 112. The top drive 118 is coupled to the top of a drill string 122, which extends through a wellhead 124 into the borehole 102 below the rig floor 108. The top drive 118 is used to rotate the drill string 122 inside the borehole 102 as the borehole 102 is being drilled in the subsurface formation 104. A bottomhole assembly 126 is provided at the bottom of the drill string 122. The bottomhole assembly 126 includes a bit 128 and a downhole motor 130 and may include other components not specifically identified but known in the art, e.g., a sensor package.

Although not shown, the automated drilling apparatus 100 includes a mud tank, which contains drilling fluid or "mud," a mud pump for transferring the drilling fluid to a mud hose, and a mud treatment system for cleaning the drilling fluid when it is laden with subsurface formation cuttings. The mud hose, in use, would be fluidly connected to the drill string so that the drilling fluid can be pumped from the mud tank into the drill string. The drilling fluid would be returned to the mud treatment system via a return path between the borehole and the drill string or inside the drill string, i.e., if the drill string is a dual-bore drill string. After the drilling fluid is cleaned in the mud treatment system, the clean drilling fluid would be returned to the mud tank.

In one embodiment of the invention, the automated drilling apparatus 100 includes sensors (or instruments) 132 for measuring drilling data. A variety of drilling data may be measured by the sensors 132. The locations of the sensors in the automated drilling apparatus 100 and the types of sensors 132 will be determined by the drilling data to be measured by the sensors 132. Examples of drilling data that may be measured by the sensors 132 include, but are not limited to, weight on bit, bit or drill string rotational speed, drill string rotational torque, rate of penetration, bit diameter, and drilling fluid flow rate. Measuring of drilling data may be direct or indirect. In the indirect measurement, the desired drilling data may be derived from other measurable drilling data. The drilling data may be measured at the surface and/or in the borehole. For example, drill string rotational torque may be measured at the surface using a sensor 132 on the top drive 118. Alternatively, pressure differential across the downhole motor 130 may be measured using a sensor 132 downhole, and the drill string rotational torque may be derived from the pressure differential. In another example, the load on hook 120 may be measured using any suitable means at the surface, and weight on bit may be inferred from the hook load. Various other drilling data not specifically mentioned above may be measured, or derived, as required by the drilling process.

In one embodiment, the drilling apparatus 100 includes one or more rig computing systems, such as rig computing system 134. In one embodiment, the rig computing system 134 includes various computing components and peripherals, such as a processor, memory, a display, a communications interface, and an input interface 144. The rig computing system 134 can receive measurement of drilling data from the various sensors 132 of the automated drilling apparatus 100. Information related to operation of the rig computing system 134 may be stored in some other computer-readable media 146 for subsequent loading into memory. Although the rig computing system 134 is shown primarily at the surface in FIG. 1, it should be noted that in other embodiments of the invention a portion or all of the rig computing system 134 may be located downhole.

Figure 2:
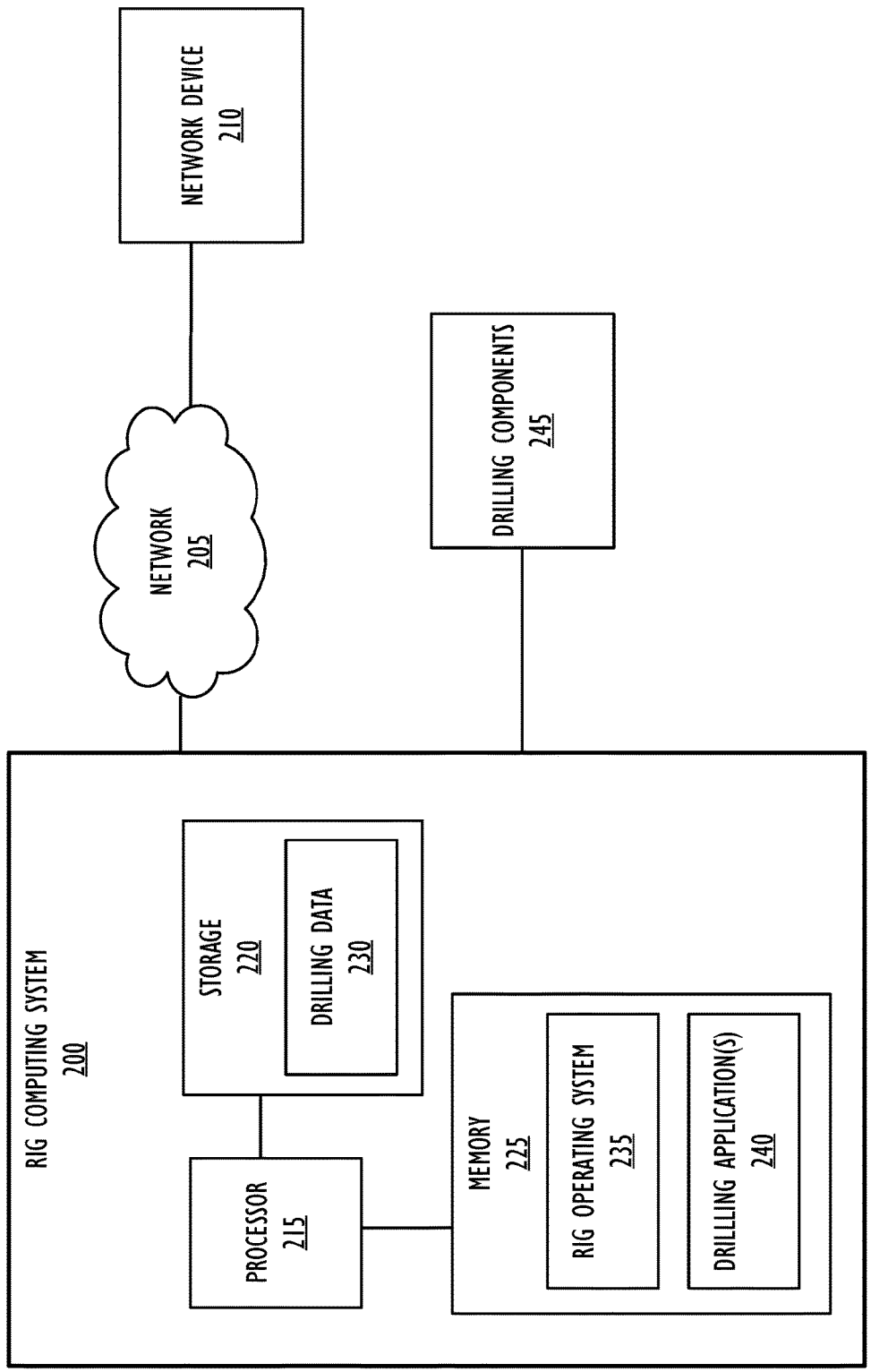
FIG. 2 is a system diagram illustrating a drilling rig software system for automated drilling.

FIG. 2 depicts a system diagram illustrating a drilling rig software system for automated drilling. FIG. 2 includes a rig computing system 200 connected to one or more network devices 210 across a network 205. Rig computing system 200 may be, for example, a detailed version of rig computing system 134 of FIG. 1. Network device 210 may include any kind of device accessible across network 205, with which rig computing system 200 may communicate. For example, network device 210 may be an additional rig computing system, a server, a remote computer, or the like. Network 205 may include many different types of computer networks available today, such as the Internet, a corporate network, a Local Area Network (LAN), or a personal network, such as those over a Bluetooth connection. Each of these networks can contain wired or wireless programmable devices and operate using any number of network protocols (e.g., TCP/IP). Network 205 may be connected to gateways and routers, servers, and end user computers.

According to one or more embodiments, rig computing system 200 may include, for example, a storage 220, a memory 225 and processor 215. Processor 215 may include a single processor or multiple processors. Further, in one or more embodiment, processor 215 may include different kinds of processors, such as a central processing unit ("CPU") and a graphics processing unit ("GPU"). Memory 225 may include a number of software or firmware modules executable by processor 215. Memory 225 may include a single memory device or multiple memory devices. As depicted, memory 225 may include a rig operating system 235 and one or more drilling applications 240. The rig operating system 235 may be a process automation platform that manages rig equipment to execute drilling applications 240. Drilling applications 240 may import well plans that describe, for example, the desired drilling directions, and the rig operating system performs the planned operations until the target depth is reached. According to one or more embodiments, the well plans may be performed at the direction of one or more drilling applications 240. Thus, multiple drilling applications 240 may control a single well plan. In one or more embodiment, the rig operating system 235 may receive tool-agnostic instructions from the drilling applications 240 and coordinate the instructions with the tools and other components of drilling components 245 to implement the well plan. In one or more embodiments, the drilling applications 240 may provide instructions for drilling operations without knowing details regarding the drilling components 245, such as the specific tools or how the tools are operated. The rig operating system 235 may translate the tool-agnostic instructions to tool-specific instructions, and deploy those tool-specific instructions to operate the drilling components 245 in compliance with the well plan. As an example, the drilling application 240 may request a tool command such as a certain Top Drive rotation speed, but the application may have no context to the Top Drive's specifications or configurations. The rig operation system 235 may take the request and translate the correct message to the rig tool. In one or more embodiments, data related to the drilling operation 230 may be stored in a storage 220 in the rig computing system. Storage 220 may include a single storage device, or multiple storage devices. Although the various components are depicted within a single computing device, in one or more embodiments, the various components and functionalities described with respect to the rig computing system 200 may instead be reconfigured in a different combination, or may be distributed among multiple computing devices.

According to one or more embodiments, rig computing system 200 may communicate with one or more network devices 210 across network 205. In one or more embodiments, the rig computing system 200 may transmit drilling data or other information from the rig computing system 200 to the network device 210. For example, rig computing system 200 may transmit data related to one or more of the drilling applications 240 to a network device 210 associated with an entity that manages the particular drilling application 240. Further, the network device 210 may include end user computers, servers, and the like, utilized in conjunction with rig computing system 200.

In one or more embodiments, multiple drilling applications may be utilized during drilling. The drilling applications may be managed by different entities, such as unique operators, contractors, owners, and the like. Thus, a first activity for a process may be directed by a first application and managed by a first entity, whereas a second activity for the process may be directed by a second application managed by a second entity. According to one or more embodiments, the rig computing system may toggle between utilizing the various drilling applications. Further, in one or more embodiment, drilling data generated while a particular entity is controlling an activity may be partitioned into a separate storage from drilling data generated while another entity is controlling an activity. The separate storage may be, for example, a separate physical storage device, a storage partition in a physical storage device, or a different data structure on a storage device. Thus, ownership of an activity may be managed for example, based on depth, formation, or section of a well plan.

Figure 3:
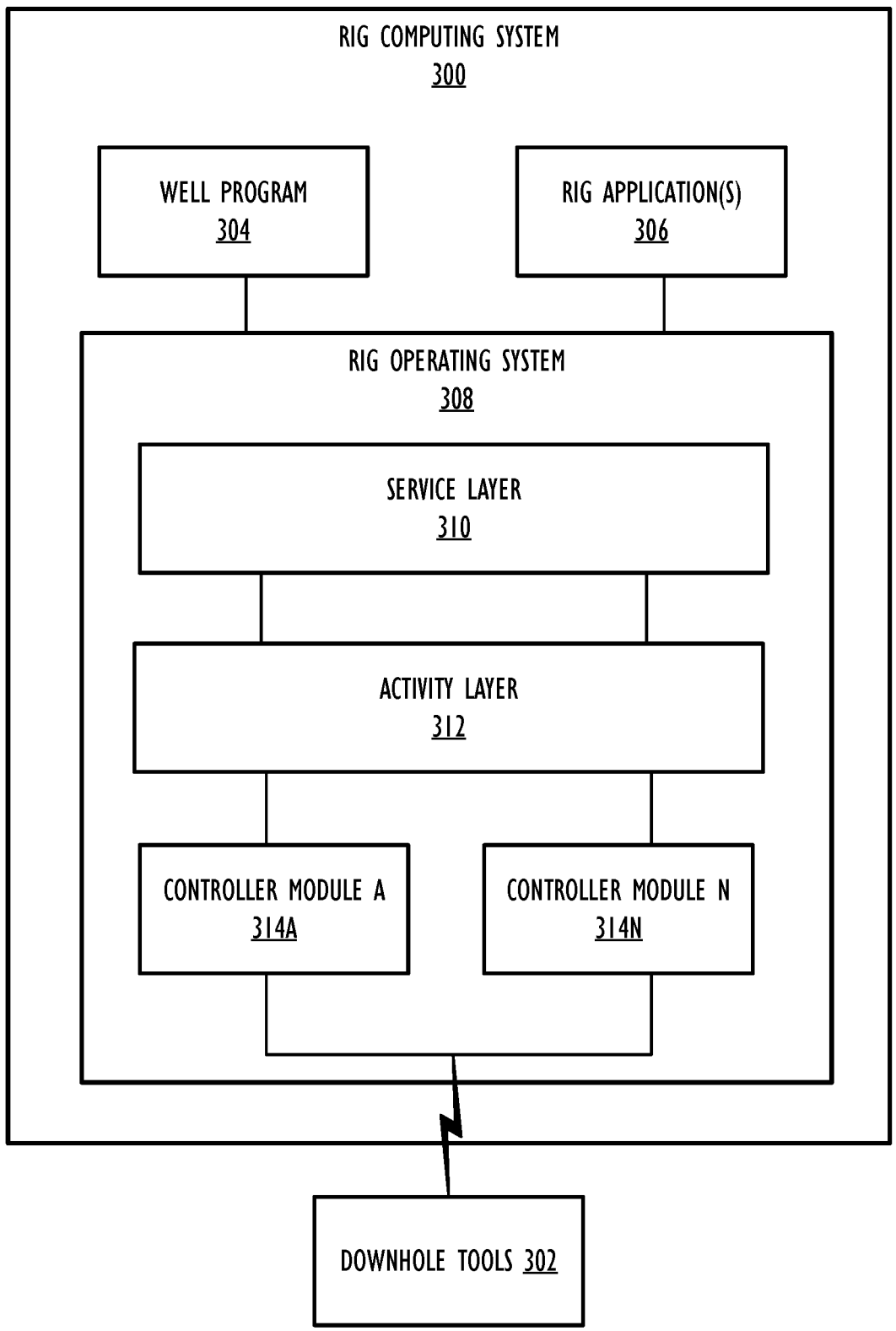
FIG. 3 is a flow diagram illustrating components of a rig computing system.

Turning to FIG. 3, a flow diagram illustrating components of a rig computing system. Specifically, FIG. 3 provides a schematic of a data flow within the rig computing system 300. The rig computing system 300 may include rig applications 306, and a rig operating system 308. In addition, the rig computing system 300 may include a well program 304, which may facilitate management of the rig. The rig operating system may include several layers in which data flows. The rig operating system 308 may receive instructions from the rig applications 306. As described above, the rig application 306 may provide tool-agnostic instructions. That is, rig applications 306 may be written for generic drilling components, and the rig operating system 308 may translate the tool-agnostic instructions into tool-specific instructions, to direct the specific downhole tools 302 accessible by the rig computing system 300.

The rig operating system 308 may include multiple components or layers that are utilized to translate tool-agnostic well plans into tool-specific instructions to direct downhole tools 302 to implement the well plan. In one or more embodiments, the rig operating system 308 may include a service layer 310, an activity layer 312, and a set of controller modules 314. In one or more embodiments, the service layer 310 may coordinate with a tool-agnostic request to an activity layer. The service layer may identify one or more activities required to complete a requested service or process. As an example, the service layer 310 may receive instructions from a drilling application with instructions to perform a drill function to a particular depth, or in a particular formation. The service layer 310 may manage the activities needed to perform the different process functions required to achieve the objective from a current drilling state. In one or more embodiments, the service layer 310 may switch between processes or objectives manually based on user input, or dynamically based on a predefined well plan or other instructions provided by a rig application 306 or well program 304. Further, in one or more embodiments, the process may be dynamically switched based on a model or algorithm input. For example, the service layer 310 may switch the process objective from drilling to tripping or to reaming based on the input.

The service layer 310 may coordinate with the activity layer 312 to manage the various activities required to complete the requested process or service. The activity layer may coordinate with one or more controller modules 314 to implement a particular activity. As an example, the activity layer 312 may identify various controller modules required to implement an activity as directed by the service layer 310. Further, according to one or more embodiments, the activity layer 312 may determine whether one or more controller modules 314 are available for performing a necessary activity. In one or more embodiments, if a controller module 314 is not available, then the activity layer 312 may trigger a notification such that the particular activity may be driven by a user.

According to one or more embodiments, the controller modules 314 act as an abstraction layer that allows rig applications 306 to be tool-agnostic, and controller module 314 to translate the instructions for specific downhole tools 302 or other drilling components. In one or more embodiments, controller modules 314 may include state machine logic to start and stop downhole tools 302 and other components, and bridge the process to the machine. The controller modules 314 may translate tool-agnostic instructions into tool-specific instructions based on the specific downhole tools 302 or other components available on a rig, thereby driving the tools. In one or more embodiments, the controller modules 314 may be tool-specific. That is, a controller module may be associated with a particular tool or tools such that the controller module generates tool-specific instructions for that particular tool. Further, in one or more embodiments, the controller modules 314 may be associated with multiple tools or components, or may be associated with a particular function of a particular tool. As an example, the top drive 118 may be utilized for processes or activities such as circulation, rotation, and pipe handling. Each of circulation, rotation, and pipe handling may be managed by a separate controller module 314. The controller module 314 associated with a particular tool may drive that tool to implement actions to perform the activity. Further, according to one or more embodiments, controller modules 314 may be associated with particular functionality. For example, one or more controller modules 314 may be associated with rotation, whereas another one or more controller modules 314 may be associated with circulation. In this example, each controller module 314 may be associated with a particular set of drilling components based on functionality, and may include the capability to translate tool-agnostic instructions into tool-specific instructions for tools associated with the particular functionality.

According to one or more embodiments, the service layer 310 may manage the scheduling of the various processes by the activity layer 312 and the controller modules 314. For example, the service layer may determine a current drilling state and, based on the drilling state, trigger the activity layer 312, and thus the controller modules 314 to perform an action. For example, if the objective is to drill, the controller modules 314 may initiate pumps to prepare for a particular flow, initiate a top drive for a particular circulation, and the like.

In addition, the service layer 310 may manage the rig applications 306 from which instructions are received. The service layer 310 may toggle between rig applications based on a drilling state. A drilling state may be determined based on sensor data from sensors 132. The drilling state may include contextual data either from or determined by the sensors 132, or environmental contextual data, such as For example, a first rig application 306 may drive the drilling operation to a particular depth, at which point a second rig application 306 may take over. Thus, the service layer 310 may monitor a current depth or other drilling state information, and toggle between the various rig applications 306 accordingly.

Further, in one or more embodiments, the well program 304 may include a well plan, which may include a set of parameters based on formations and sections, utilized to perform drilling operations. Well program 304 may monitor various drilling measurements to ensure that the various drilling components perform within certain thresholds. As an example, thresholds may determine safe operation of the components, or may be utilized for resource management, such as power savings, or to limit wear and tear on machinery. According to one or more embodiments, the thresholds may be set by the well plan 304 or another rig application 306. Further, in one or more embodiments, the thresholds may be dynamically modified, for example, through user input during operation of the rig. The thresholds may be set based on various drilling parameters, such as drilling state (i.e., a current activity, a current depth, or other contextual information). The drilling parameters may be determined, for example, based on sensor data from sensors 132. In one or more embodiments, a rig application 306 causes a threshold to be exceeded, then the well program 304 may modify the process or activity directed by the application such that the drilling parameter remains within a threshold. For example, if the threshold values at a particular depth indicate that the rotation should be between 125 and 550 rotations per minute, and an actual reading from a sensor on the top drive indicates that the actual rotation is 40 rotations per minute, the well program 304 may override the rig application 306 to ensure that the minimum rotation is met. Conversely, if the actual rotation is 600 rotations per minute, then the well program 304 may direct the rig operating system 308 to direct the top drive 118 lower the rotation speed. The rotation, or any other measured parameter, may be increased or decreased by a predetermined measurement, a particular percentage, or any other method.

Figure 4:
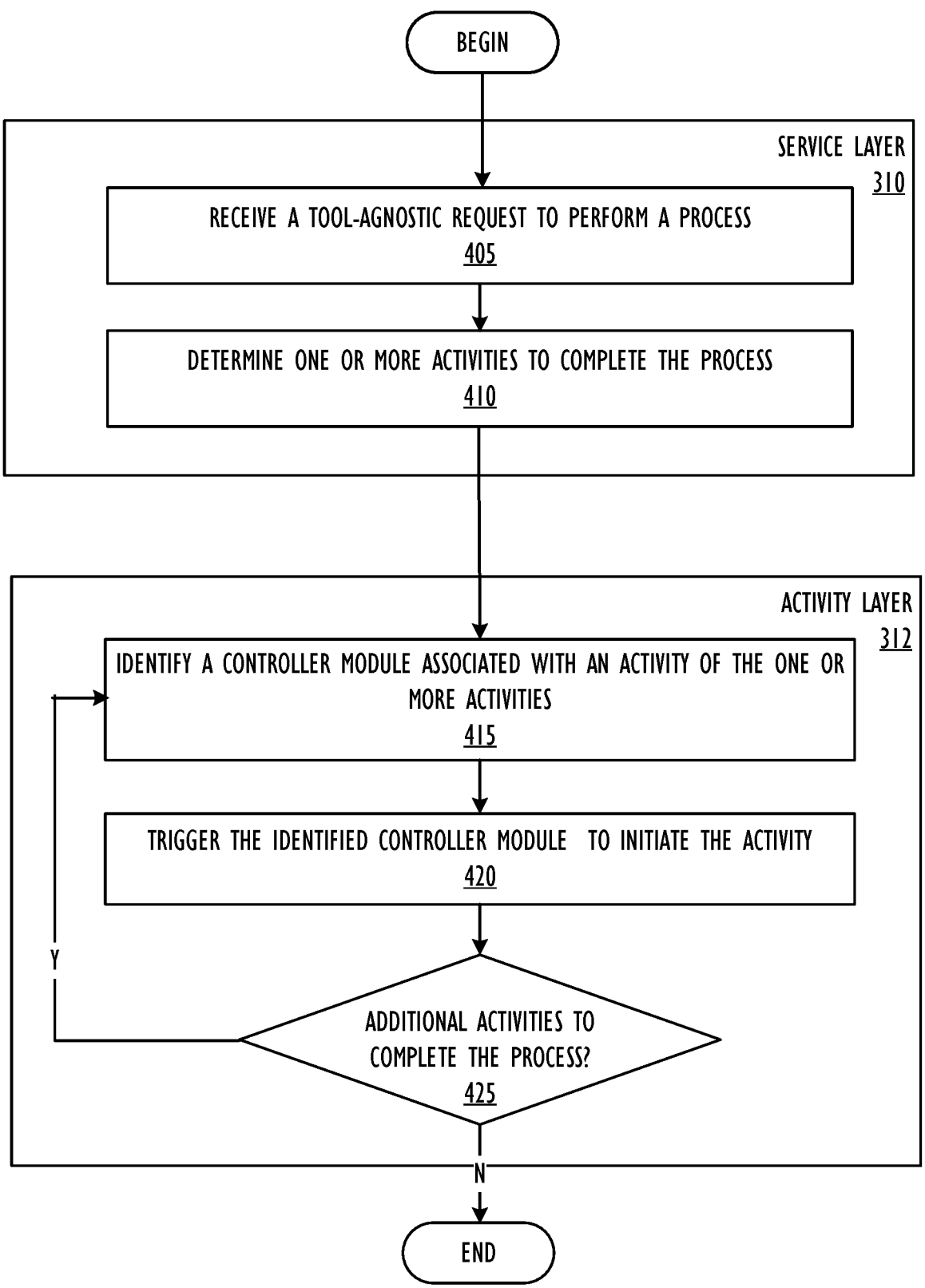
FIG. 4 is a flowchart illustrating a method for performing automated drilling utilizing a rig computing system.

FIG. 4 is a flowchart illustrating a method for performing automated drilling utilizing a rig computing system. For purposes of explanation, some functionality is depicted and described as being conducted by the service layer 310 while some functionality is depicted and described as being conducted by the activity layer 312. However, in one or more embodiments, the various functionality may be distributed in a different manner, or may even be conducted by alternate modules.

The method begins at 405, and the service layer 310 receives a tool-agnostic request to perform a process. As an example, the tool-agnostic request may be received from a drilling application and may request a particular objective to be reached. Further, in one or more embodiments, a particular objective may not be expressly provided by a rig application 306, but the service layer 310 may determine that an objective must be reached prior to a requested objective. As an example, if the objective is to drill, but the bit 128 hasn't tagged bottom, then the rig operating system 308 may implement the tag bottom objective prior to the drill objective.

At 410, the service layer 310 determines one or more activities to complete the process. In one or more embodiments, the service layer 310 may determine activities required to reach the objective. The activities required may be obtained from the rig application 306, or may be determined by the well program 304, or the rig operating system 308. For example, if the process is "take weight," the activities needed may include hoisting pipe out of slips, and monitoring for transferred weight rom the slips to the drawworks 116. As another example, if the process is set rotation, the activities may include sending a command to the top drive to start rotation, and rotating to the desired rotation set point.

The flowchart continues at 415 and the activity layer 312 identifies a controller module associated with an activity of the one or more activities. As described above, the controller module 314 may be activity- or functionality-specific. Thus, if the activity includes commanding the top drive to start rotation, the controller module 314 may be associated with rotation. For example, the controller module 314 may be assigned a rotation functionality. The controller module may then send a command to a top drive to initiate rotation. Thus, the activity layer 312 and the service layer 310 may not know the specifics of the top drive 118, or even that a top drive is utilized for rotation. Further, the rig applications 306 also do not need to know the specifics of the top drive, or that the top drive is used for rotation. Rather, the service layer 310 and activity layer 312 only need to determine that rotation is needed, and be able to identify the particular controller module 314 assigned to rotation. The assigned controller module 314 may then command the appropriate drilling component, such as the top drive 118 to initiate rotation. At 420, the activity layer 312 triggers the identified controller module to initiate the activity.

The flowchart continues 425 and a determination is made by the activity layer 312 regarding whether additional activities are needed to complete the process. If at 425 it is determined that there are additional activities to be completed, then the flowchart continues at 405, and the activity layer 312 continues to coordinate the various activities required to complete a particular process. For example, a second activity may be identified that requires the first activity to be completed prior to the second activity initializing. Said another way, the second activity may be conditional upon completion of the first activity. For example, the first activity may need to be complete or reach a particular state before it is optimal for the second activity to occur, for safety reasons, resource management, or any other reason. In this example, when the flowchart continues at 415, the activity layer 312 may identify a second controller module associated with the second activity, and trigger the second controller module to initiate the second activity. Upon determining that the user has completed a particular activity, the flow chart may continue at 425 and the activity layer 312 may determine whether any additional processes are needed, and identify further controller modules for the further additional activities.

According to one or more embodiments, if at 415 a controller module cannot be identified for a particular activity, then the activity layer 312 or the service layer 310 may direct a user to complete the activity. For example, the rig operating system 308 may generate and present a prompt for a user, such as an operator of the rig, to direct a user to complete the activity. The prompt may be visual, audio, or textual in nature, or may be a combination. The rig operating system 308 may monitor for an indication that the activity is complete. The indication may be an automatic indication, or may be an indication from the user through a user interface to indicate that the activity is complete.

Returning to 425 if it is determined that there are no additional activities to complete the process, then the flowchart ends. The service layer 310 may then continue with a next requested process, or may wait for any additional processes requested by a drilling application. It should be understood that although the flowchart depicts the activities occurring in a sequential manner, in one or more embodiments, multiple activities may be active at the same time. The service layer 310 may manage the initialization and processing of multiple activities.

Figure 5:
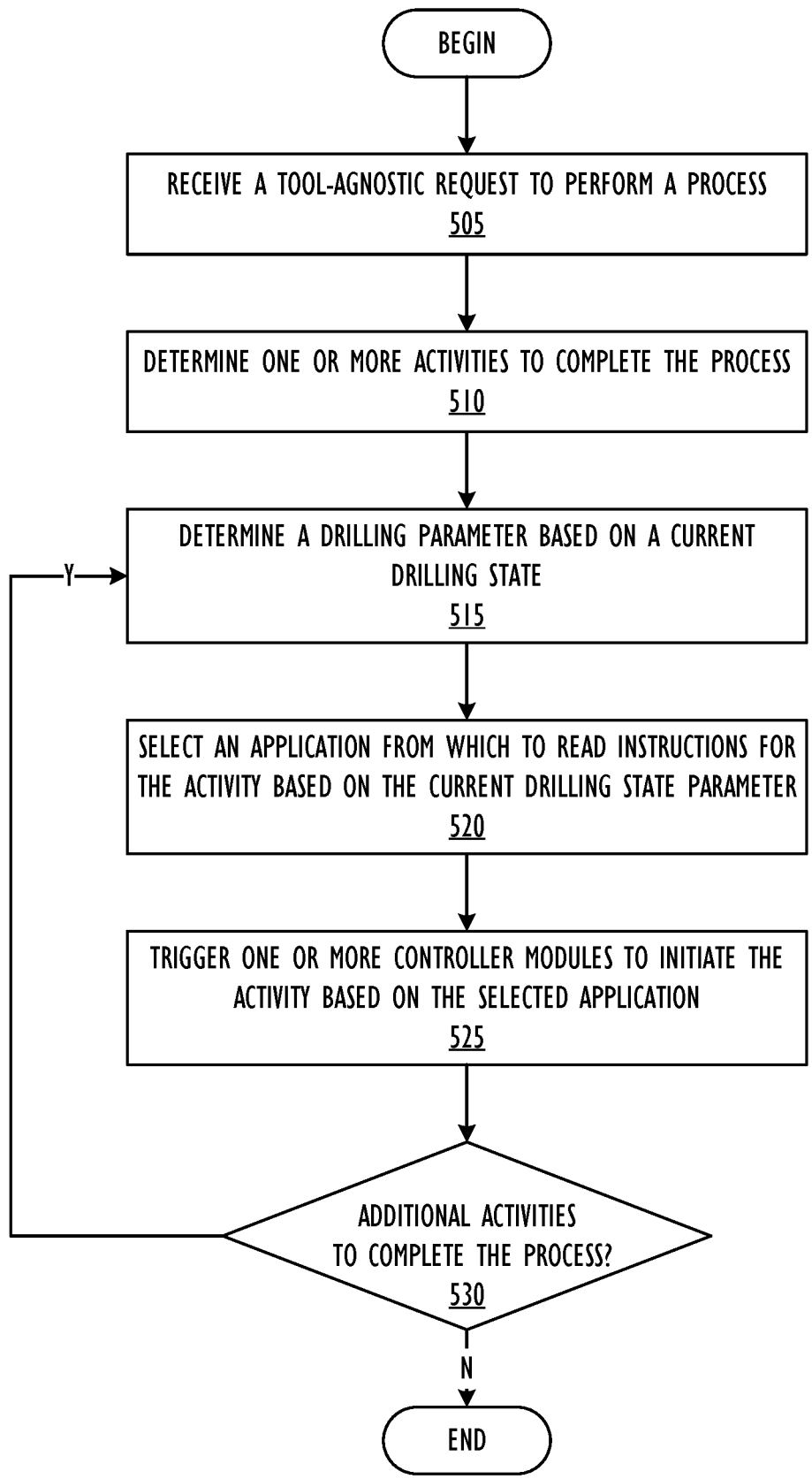
FIG. 5 is a flowchart illustrating a method to manage automated drilling by multiple applications.

FIG. 5 is a flowchart illustrating a method to manage automated drilling by multiple applications. As described above, different parts of a process or different processes may be controlled by different applications. The different applications may be associated with particular operators, contractors, or the like. In one or more embodiments, data generated while a particular application is managing the automated drilling may be stored in a separate data structure from that in which data is stored while another application is managing the automated drilling.

The flowchart begins at 505, and the rig operating system 308 receives a tool-agnostic request to perform a process. As an example, the rig operating system 308 may receive a tool-agnostic objective to drill to a particular depth. At 510, the rig operating system 308 determines one or more activities to complete the process. The activities required may be obtained from the rig application 306, or may be determined by the well program 304, or the rig operating system 308.

The flowchart continues at 515, and the rig operating system 308 determines a drilling parameter based on a current drilling state. In one or more embodiments, the drilling state may be a current point in a well plan, a current depth, a time of day, a current formation, or any other kind of contextual information. The drilling state may be based on data external to the rig, such as day or time, or may be based on contextual data associated with the rig, such as formation or depth. In one or more embodiments, the rig operating system 308 may obtain sensor data or other data from the rig to determine a drilling state.

At 520, the rig operating system 308 selects an application from which to read instructions for the activity based on the current drilling state parameter. In one or more embodiments, the rig operating system 308 may toggle between applications based on a number of factors. For example, certain activities, such as rotation or flow, may be directed by a particular application, whereas other activities are directed by another application. As another example, certain portions of a well plan may be managed by one application while another application manages another part of the well plan. For example, a first application may handle tagging bottom, while a second application handles drilling. In one or more embodiments, the application from which the rig operating system 308 selects to read the instructions may be based on a well state or other contextual data, such as a current depth or a portion of a well plan that has been completed.

The flowchart continues at 525, where the rig operating system 308 triggers one or more controller modules 314 to initiate the activity based on the selected application. At 530, a determination is made regarding whether additional activities are required to complete a process. If at 530 a determination is made that no additional activities are required to complete the process, then the flowchart concludes. In one or more embodiments, the service layer may continue to coordinate process requested by various drilling applications, either by reading a new drilling instruction, or by waiting for additional drilling instructions.

If at 530 it is determined that additional activities are required to complete the process, then the flowchart continues at 515 and the rig operating system 308 determines a current drilling state. According to one or more embodiments, if at 415 a controller module cannot be identified for a particular activity, then the activity layer 312 or the service layer 310 may direct a user to complete the activity. For example, the rig operating system 308 may generate and present a prompt for a user, such as an operator of the rig, to direct a user to complete the activity. The prompt may be visual, audio, or textual in nature, or may be a combination. The rig operating system 308 may monitor for an indication that the activity is complete. The indication may be an automatic indication, or may be an indication from the user through a user interface to indicate that the activity is complete.

Returning to 530 if it is determined that there are no additional activities to complete the process, then the flowchart ends. The service layer 310 may then continue with a next requested process, or may wait for any additional processes requested by a drilling application. It should be understood that although the flowchart depicts the activities occurring in a sequential manner, in one or more embodiments, multiple activities may be active at the same time. The service layer 310 may manage the initialization and processing of multiple activities.

In FIGS. 4-5, activities are described as being completed in a linear process for illustrative purposes only. It should be understood that some activities may be performed concurrently or in concert with each other. Moreover, the various functionality described in each of FIGS. 4-5 may be reordered or combined in a different manner, according to one or more embodiments.

Figure 6:
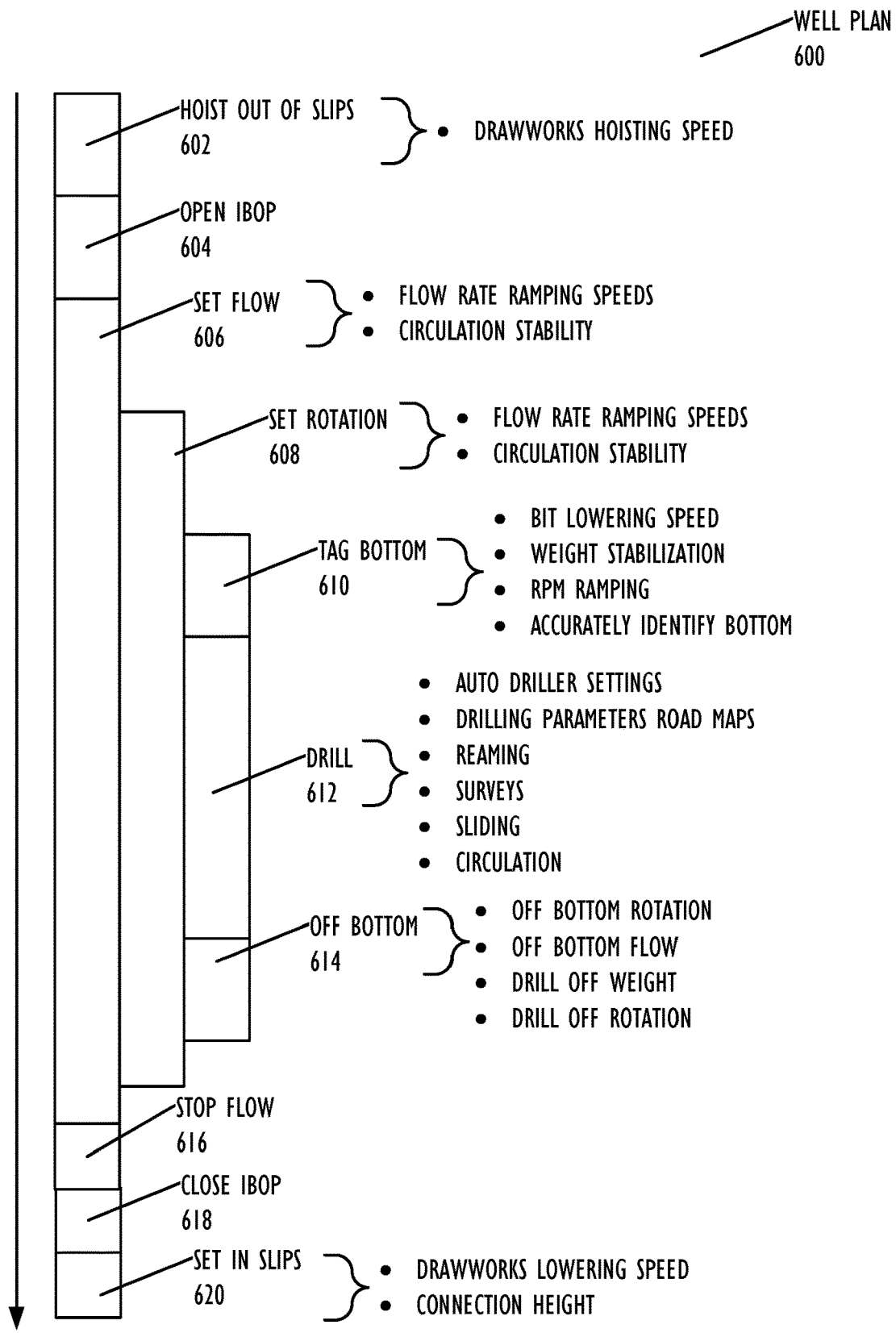
FIG. 6 is a flow diagram illustrating various operations of automated drilling and their associated activities.

FIG. 6 is a flow diagram illustrating various operations of automated drilling and their associated activities. Specifically, FIG. 6 illustrates an example well plan 600. The well plan includes multiple phases, each of which may be considered a process. The well plan begins with hoist out of slips at 602. Hoist out of slips may include an activity of managing the drawworks hoisting speed. Then, the well plan continues at 604 by opening an inside blow out preventer ("IBOP"). The flow diagram continues with set flow 606. Activities associated with set flow may include managing low rate ramping speeds, and circulation stability. Thus, to achieve "set flow" 606, a controller module associated with flow, and a controller module associated with circulation may be utilized by the rig operating system. For example, the rig operating system may manage the mud pump's strokes per minute output to achieve the desired flow, without reading instructions from the well plan that specify how to operate the mud pumps. For example, the well plan may not be written toward particular mud pump specifications, such as liner size, pump efficiency, or strokes to achieve the flow rate. The flow diagram continues at 608 with "set rotation." Here, associated activities may include flow rate ramping speeds and circulation stability. Thus, flow may be maintained through the process. For example, rotation may not occur without active flow.

At 610, the flow diagram continues with "tag bottom." The activities associated with tagging bottom may include managing a bit lowering speed, weight stabilization, RPM ramping, and accurately identifying the bottom. Then, a "drill" process begins. The drill process may include managing auto driller settings, drilling parameter road maps, reaming, surveys, siding, and circulation. In one or more embodiments, the drilling parameters may be obtained, for example, from rig applications. The flow diagram continues on at 614, with the process of "off bottom." Off bottom activities may include off bottom rotation, off bottom flow, drill off weight, and drill off rotation. Then, at 616, the next process may include "stop flow," at which point the flow stops. The flow diagram continues at 618 with "close IBOP," during which time the inside blow out preventer may be closed. Finally, at 620, the flow diagram ends with "set in slips," for which activities may include managing drawworks lowering speed and connection height.

Figure 7:
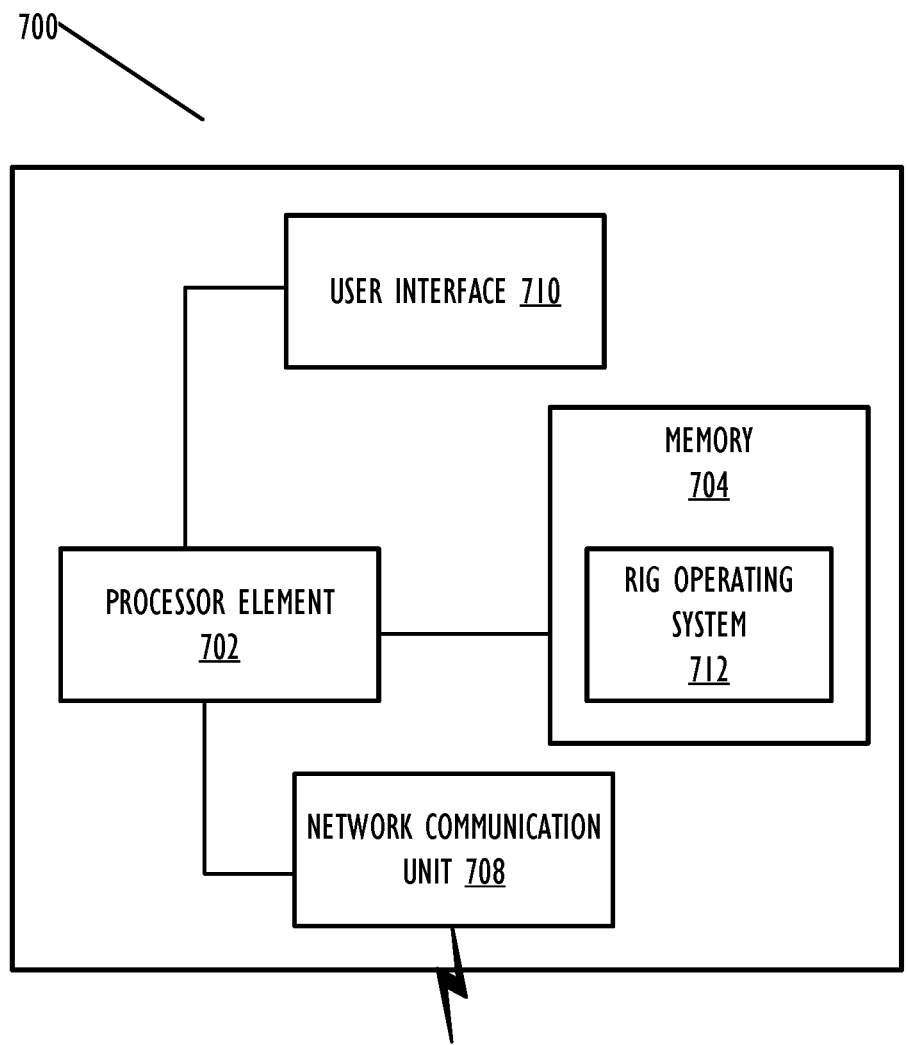
FIG. 7 is a block diagram illustrating a rig computing device for use with techniques described herein according to another embodiment.

FIG. 7 illustrates that memory 704 may be operatively coupled to processing element 702. Memory 704 may be a non-transitory medium configured to store various types of data. For example, memory 704 may include one or more memory devices that comprise a non-volatile storage device and/or volatile memory. Volatile memory, such as random access memory (RAM), can be any suitable non-permanent storage device. The non-volatile storage devices can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage device may be used to store overflow data if allocated RAM is not large enough to hold all working data. The non-volatile storage device may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processing element 702. In one embodiment, the compiling process of the software program may transform program code written in a programming language to another computer language such that the processing element 702 is able to execute the programming code. For example, the compiling process of the software program may generate an executable program that provides encoded instructions (e.g., machine code instructions) for processor 702 to accomplish specific, non-generic, particular computing functions.

After the compiling process, the encoded instructions may then be loaded as computer executable instructions or process steps to processing element 702 from storage (e.g., memory 704) and/or embedded within the processing element 702 (e.g., cache). Processing element 702 can execute the stored instructions or process steps in order to perform instructions or process steps to transform the computing device into a non-generic, particular, specially programmed machine or apparatus. Stored data, e.g., data stored by a storage device, can be accessed by processing element 702 during the execution of computer executable instructions or process steps to instruct one or more components within the computing device 700.

A user interface 710 can include a display, positional input device (such as a mouse, touchpad, touchscreen, or the like), keyboard, or other forms of user input and output devices. The user interface 710 can be coupled to processor element 702. Other output devices that permit a user to program or otherwise use the computing device can be provided in addition to or as an alternative to network communication unit 708. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 700 may comprise other components well known in the art, such as sensors, powers sources, and/or analog-to-digital converters, not explicitly shown in FIG. 7.

The programmable devices depicted in FIG. 7 is a schematic illustration of embodiments of programmable devices which may be utilized to implement various embodiments discussed herein. Various components of the programmable devices depicted in FIG. 7 may be combined in a system-on-a-chip (SoC) architecture.

It is to be understood that the various components of the flow diagrams described above, could occur in a different order or even concurrently. It should also be understood that various embodiments of the inventions may include all or just some of the components described above. Thus, the flow diagrams are provided for better understanding of the embodiments, but the specific ordering of the components of the flow diagrams are not intended to be limiting unless otherwise described so.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Many other embodiment will be apparent to those of skill in the art upon reviewing the above description. The scope of the invention should therefore be determined with reference to the appended claims, along with the full scope of equivalents to which such claims are entitled.

What is claimed is:

1. A non-transitory computer readable medium for automated drilling,
   comprising computer readable code executable by one or more processors to:
   receive, at a service layer of a rig operating system, a tool-agnostic request to perform a process;
   determine, by the service layer of the rig operation system, one or more activities to complete the process; and
   direct an activity layer of the rig operating system to cause the one or more activities to be performed, wherein the activity layer is configured to:

identify a first controller module associated with a first activity of the one or more activities; and trigger the first controller module to initiate the first activity, wherein the first controller module is configured to:
receive, from the activity layer, tool-agnostic instructions based on the tool-agnostic request,
identify a first one or more drilling tools to initiate the first activity,
translate the tool-agnostic instructions to tool-specific instructions, and
direct the first one or more drilling tools to initiate the first activity in accordance with the tool-specific instructions.

2. The computer readable medium of claim 1, further comprising computer readable code to:
identify a second activity of the one or more activities;
determine that the second activity is conditional upon a completion of the first activity;
determine that the first activity is completed; and
in response to determining that the first activity is completed:
identify a second controller module associated with the second activity, and
trigger the second controller module to initiate the second activity,
wherein the second controller module identifies and directs a second one or more drilling tools to initiate the second activity.

3. The computer readable medium of claim 2,
wherein the first activity is controlled by a first entity, and
wherein the second activity is controlled by a second entity.

4. The computer readable medium of claim 1, further comprising computer readable code to:
while the first activity is active, receive sensor data from at least one of the one or more drilling tools;
compare the sensor data to one or more predefined thresholds; and
in response to determining that the sensor data satisfies at least one of the one or more predefined thresholds, modify the first activity such that additional sensor data is within the at least one of the one or more predefined thresholds.

5. The computer readable medium of claim 1, further comprising computer readable code to:
identify a second activity of the one or more activities;
attempt to detect a second controller module associated with the second activity; and
in response to failing to detect the second controller module, present a prompt to a user to direct a second one or more drilling tools to initiate the second activity.

6. The computer readable medium of claim 5, further comprising computer readable code to:
identify a third activity of the one or more activities;
determine that the third activity is conditional upon a completion of the second activity;
receive an indication that the second activity is completed; and
in response to receiving the indication that the second activity is completed:
identify the second controller module associated with the third activity, and
trigger the second controller module to initiate the third activity,
wherein the second controller module identifies and directs a second one or more drilling tools to initiate the second activity.

7. The computer readable medium of claim 1, further comprising computer readable code to:
determine a current drilling state parameter; and
select an application of a plurality of applications from which to receive instructions for the process based on the current drilling state parameter,
wherein the plurality of applications are associated with different operators.

8. A method for automated drilling, comprising:
receiving, at a service layer of a rig operating system, a tool-agnostic request to perform a process;
determining, by the service layer of the rig operation system, one or more activities to complete the process; and
direct an activity layer of the rig operating system to cause the one or more activities to be performed, wherein the activity layer is configured to:
identify a first controller module associated with a first activity of the one or more activities; and
trigger the first controller module to initiate the first activity, wherein the first controller module is configured to:
receive, from the activity layer, tool-agnostic instructions based on the tool-agnostic request,
identify a first one or more drilling tools to initiate the first activity,
translate the tool-agnostic instructions to tool-specific instructions, and direct the first one or more drilling tools to initiate the first activity in accordance with the tool-specific instructions.

9. The method of claim 8, further comprising:
identifying a second activity of the one or more activities;
determining that the second activity is conditional upon a completion of the first activity;
determining that the first activity is completed; and
in response to determining that the first activity is completed:
identifying a second controller module associated with the second activity, and
triggering the second controller module to initiate the second activity,
wherein the second controller module identifies and directs a second one or more drilling tools to initiate the second activity.

10. The method of claim 9, wherein the first activity is controlled by a first entity, and wherein the second activity is controlled by a second entity.

11. The method of claim 8, further comprising:
while the first activity is active, receiving sensor data from at least one of the first one or more drilling tools;
comparing the sensor data to one or more predefined thresholds; and
in response to determining that the sensor data satisfies at least one of the one or more predefined thresholds, modifying the first activity such that additional sensor data is within the at least one of the one or more predefined thresholds.

12. The method of claim 8, further comprising:
identifying a second activity of the one or more activities;
attempting to detect a second controller module associated with the second activity; and
in response to failing to detect the second controller module, presenting a prompt to a user to direct a second one or more drilling tools to initiate the second activity.

13. The method of claim 12, further comprising:
identifying a third activity of the one or more activities;
determining that the third activity is conditional upon a completion of the second activity;
receiving an indication that the second activity is completed; and
in response to receiving the indication that the second activity is completed:
identifying the second controller module associated with the third activity, and
triggering the second controller module to initiate the third activity,
wherein the second controller module identifies and directs the second one or more drilling tools to initiate the second activity.

14. The method of claim 8, further comprising:
determining a current drilling state parameter; and
selecting an application of a plurality of applications from which to receive instructions for the process based on the current drilling state parameter,
wherein the plurality of applications are associated with different operators.

15. A system for automated drilling, comprising:
one or more processors; and
one or more memories coupled to the one or more processors and computer readable code stored on the one or more memories and executable by the one or more processors to:
receive, at a service layer of a rig operating system, a tool-agnostic request to perform a process;
determine, by the service layer of the rig operation system, one or more activities to complete the process; and
direct an activity layer of the rig operating system to cause the one or more activities to be performed, wherein the activity layer is configured to:
identify a first controller module associated with a first activity of the one or more activities; and
trigger the first controller module to initiate the first activity,
wherein the first controller module is configured to:
receive, from the activity layer, tool-agnostic instructions based on the tool-agnostic request,
identify a first one or more drilling tools to initiate the first activity,
translate the tool-agnostic instructions to tool-specific instructions, and
direct the first one or more drilling tools to initiate the first activity in accordance with the tool-specific instructions.

16. The system of claim 15, further comprising computer readable code to:
identify a second activity of the one or more activities;
determine that the second activity is conditional upon a completion of the first activity;
determine that the first activity is completed; and
in response to determining that the first activity is completed:
identify a second controller module associated with the second activity, and
trigger the second controller module to initiate the second activity,
wherein the second controller module identifies and directs a second one or more drilling tools to initiate the second activity.

17. The system of claim 16, wherein the first activity is controlled by a first entity, and wherein the second activity is controlled by a second entity.

18. The system of claim 15, further comprising computer readable code to:
while the first activity is active, receive sensor data from at least one of the one or more drilling tools;
compare the sensor data to one or more predefined thresholds; and
in response to determining that the sensor data satisfies at least one of the one or more predefined thresholds, modify the first activity such that additional sensor data is within the at least one of the one or more predefined thresholds.

* * * * *